United States Patent [19]

Wake

[11] Patent Number: 4,796,201
[45] Date of Patent: Jan. 3, 1989

[54] STORED PROGRAM CONTROLLED SYSTEM FOR CREATING AND PRINTING GRAPHICS BEARING PACKAGING

[76] Inventor: Warren K. Wake, 360 Walnut St., Blawnox, Pa. 15238

[21] Appl. No.: 728,922

[22] Filed: Apr. 30, 1985

[51] Int. Cl.$^4$ .................................... G06F 15/626
[52] U.S. Cl. .................................... 364/518; 364/521; 364/522; 340/724; 340/727
[58] Field of Search ............. 364/518, 521, 522, 188; 340/722, 723, 727, 724; 156/DIG. 9, DIG. 24; 356/391, 392, 393

[56] References Cited

U.S. PATENT DOCUMENTS

| | | | |
|---|---|---|---|
| 4,393,450 | 7/1983 | Jerard | 364/475 |
| 4,451,895 | 5/1984 | Sliwkowski | 364/188 |
| 4,532,602 | 7/1985 | Duvall | 364/518 |
| 4,600,200 | 7/1986 | Oka et al. | 364/522 |
| 4,706,205 | 11/1987 | Akai et al. | 364/518 |

FOREIGN PATENT DOCUMENTS

| | | | |
|---|---|---|---|
| 57-169866 | 10/1982 | Japan | 364/518 |
| 59-195759 | 11/1984 | Japan | 364/518 |

OTHER PUBLICATIONS

Katz, Genevieve and Lou, "Capturing the Third Dimension", Oct. 1970, *Computer Decisions*, vol. 2, No. 10, pp. 50–53.
Cook et al., "A Reflectance Model For Computer Graphics", Aug. 1981, *Computer Graphics*, vol. 15, No. 3.
Weiman, "Continuous Anti–Aliased Rotation of Zoom of Raster Images", Jul. 1980, *Computer Graphics*, vol. 14, No. 3.
Blinn, "Computer Display of Curved Surfaces", Dec. 1978, Dept. of Computer Science, Univ. of Utah Thesis Library.

*Primary Examiner*—Parshotam S. Lall
*Assistant Examiner*—Brian M. Mattson
*Attorney, Agent, or Firm*—Hopgood, Calimafde, Kalil, Blaustein & Judlowe

[57] ABSTRACT

Stored program controlled data processing apparatus operates in concert with display and printing equipment to create, modify and print graphics for consumer goods or other packaging applications. Packaging graphics are prepared by entering and defining plural image elements which may comprise photographic or other images, geometric form, text, or anything else capable of print reproduction. The evolving composite graphics are viewed on a computer display peripheral, and may be modified as desired.

In accordance with varying aspects of the present invention, a display image is formed illustrating the packaging graphics "wrapped" around and onto the surface of a user-specified three dimensional form to present and evaluate the packaging in its intended application. Moreover, the wrapped three dimensional display can be rotated to view the packaging from diverse directions. Once in satisfactory form, the completed packaging design stored in computer memory is printed and reproduced as desired to satisfy a requirement for packaging materials.

17 Claims, 6 Drawing Sheets

MAIN PROCESSING LOOP

MODIFY ROUTINE 27

WRAP (+ MOVE) ROUTINE 42

STORED PROGRAM CONTROLLED SYSTEM FOR CREATING AND PRINTING GRAPHICS BEARING PACKAGING

This invention relates to apparatus and methodology for creating packaging designs and, more specifically, to a stored program controlled system for creating, viewing, modifying and printing graphics-bearing packaging materials.

It is an object of the present invention to provide improved apparatus for creating and printing designs formed of pictures, geometric forms, text, logos and/or other graphic elements for packaging materials, e.g., labels surrounding canned goods, paper, plastic or fabric sheets adhered about a box or other container, and the like.

It is another object of the present invention to provide apparatus for developing packaging graphics which permits entry and modification of plural image elements to create an overall graphic design; and which displays an emerging image design for viewing and evaluation.

Yet another object of the present invention is the provision of packaging development apparatus which assigns priorities to packaging design elements so that only appropriate portions of partially spatially overlapping image elements contribute to the stored, displayed and printed composite packaging design.

Still another object of the present invention is the provision of stored program controlled packaging originating apparatus which permits viewing of packaging formed ("wrapped") into a selected three-dimensional shape on either a stationary or rotating basis.

The above and other objects of the present invention are realized in specific illustrative stored program controlled data processing apparatus which operates in concert with display and printing equipment to create, modify and print graphics for consumer goods or other packaging applications. Packaging graphics are prepared by separately entering and defining plural image elements comprising photographic or other scanned images, geometric forms, text or anything else capable of print reproduction. The evolving composite graphics are viewed on a computer display peripheral, and may be modified as desired.

In accordance with varying aspects of the present invention, a display image is formed illustrating the packaging graphics "wrapped" around and onto the surface of a user-specified three dimensional form to present and evaluate the packaging in its intended application. Moreover, the wrapped three dimensional display can be rotated to view the packaging from diverse directions. Once in satisfactory form, the completed packaging design stored in computer memory is printed and reproduced as desired to satisfy a requirement for packaging materials.

The foregoing features of the present invention may be more fully understood from the following detailed discussion of a specific, illustrative embodiment thereof, presented hereinbelow in conjunction with the accompanying drawing, in which:

FIG. 1 is a flow chart depicting overall computer processing for the instant packaging graphics originating and printing apparatus;

FIGS. 2A and 2B (referred to herein as composite FIG. 2) are respectively the upper and lower portions of a flow chart depicting computer processing for a graphic modification routine 27 of FIG. 1;

Figure 6:
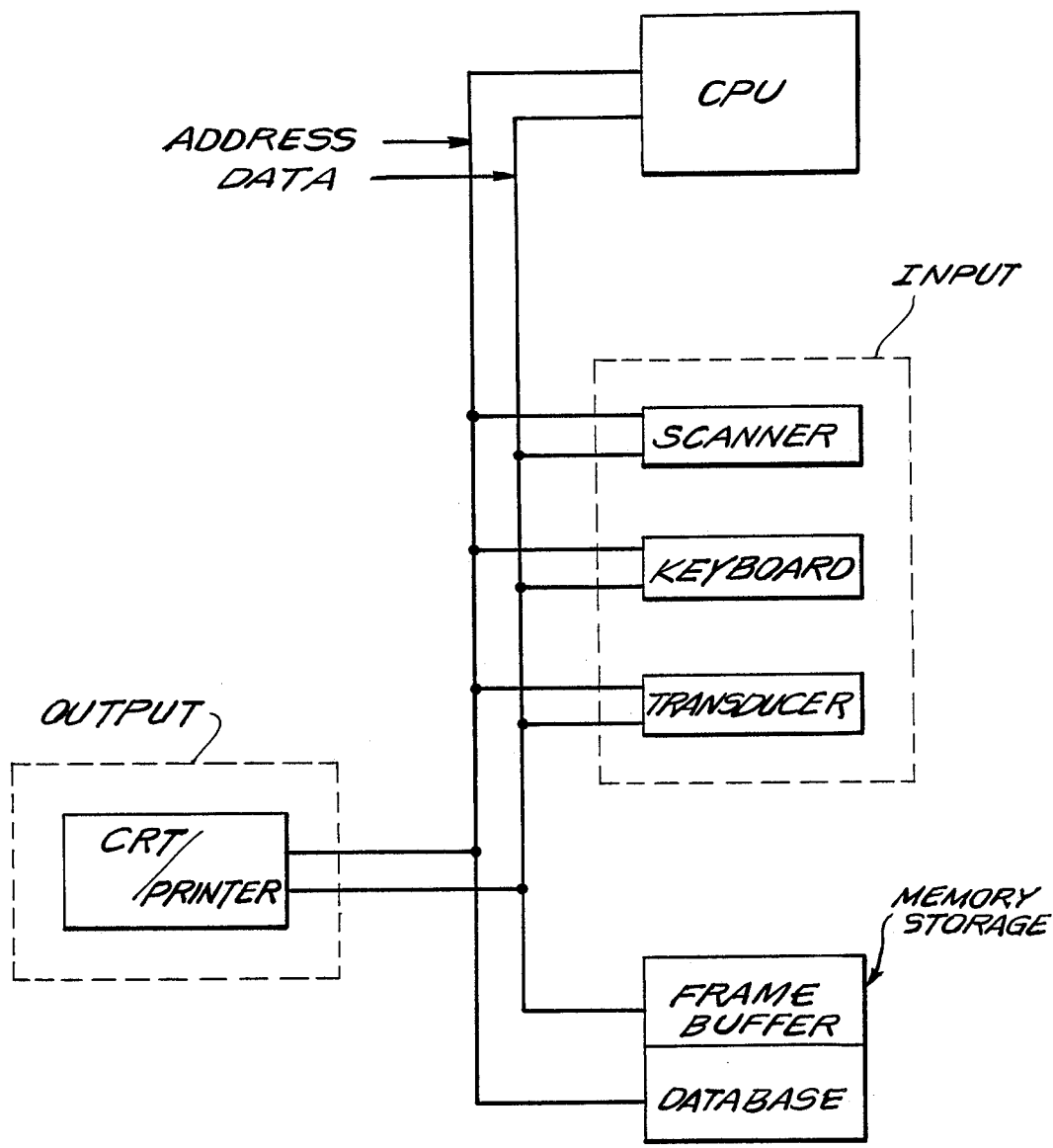

FIG. 6 provides a block diagram of per se well known input-output devices in accordance with the present invention.

Discussing the instant invention first briefly in overview, it is a fundamental desideratum to facilitate the development of a design to be printed as on the external packaging for consumer or other goods. The packaging sheet might form the container per se; or a label attached to a cylindrical can; a paper, plastic or other sheet wrapped around a box or carton containing food or any other type goods; or the like. As a first matter, the processing of the instant invention permits a designer to originate and modify graphics until satisfied with the esthetics and accuracy of the composite graphics presentation which will ultimately be printed on the packaging. The packaging graphics may include photographs, arbitrary shapes or forms, text, and/or anything else capable of planar presentation.

In the initial formation of an image, the operator/graphics creator enters each constituent ("element") of the ultimate image and defines its parameters (e.g., size, orientation, texture and the like, as below described). As or after individual image elements have been entered and stored in computer memory they may be modified as desired—either individually or in associated groups.

As the packaging graphics are being developed, the detail is stored in computer memory and in a display-controlling buffer memory ("frame buffer"). That is, the emerging graphics as stored in the frame buffer defines the image presented by a computer peripheral display device, e.g., a cathode ray tube. As additions, modifications or deletions are being made to one or more image elements, the effect is presented to the designer on the face of the display. The designer has command input elements (e.g., a keyboard, image scanner and coordinate positional controller(s) to enter image element defining data, modification commands and the like as desired.

When the designer is provisionally satisfied with his packaging design (or earlier if desired), he may view the packaging in a form as though it were wrapped around a three dimensional form which the designer is free to specify. Thus, for example, the designer may enter the three dimensional form of a cylinder if the packaging is to be disposed in service around a can, barrel or the like and view the packaging in this form on the face of the display device (as in the form of FIGS. 4A or 4B). Moreover, the designer can rotate the package disposed in the three dimensional form about an axis of rotation to view the packaging appearance from different visual orientations. Please see, for example, the cylindrical image of FIG. 4B comprising a counterclockwise rotation about a central vertical axis from that of FIG. 4A.

After viewing the three dimensional appearance of the packaging, further additions or modifications may be made to the packaging graphics and the three dimensional presentation repeated. This process is iteratively repeated as desired until all concerned are satisfied with the packaging as developed (and stored in memory). Once the packaging design is in final form, it is communicated from memory to any per se well known printing device for reproduction as desired to satisfy the packaging requirement.

Figure 1:
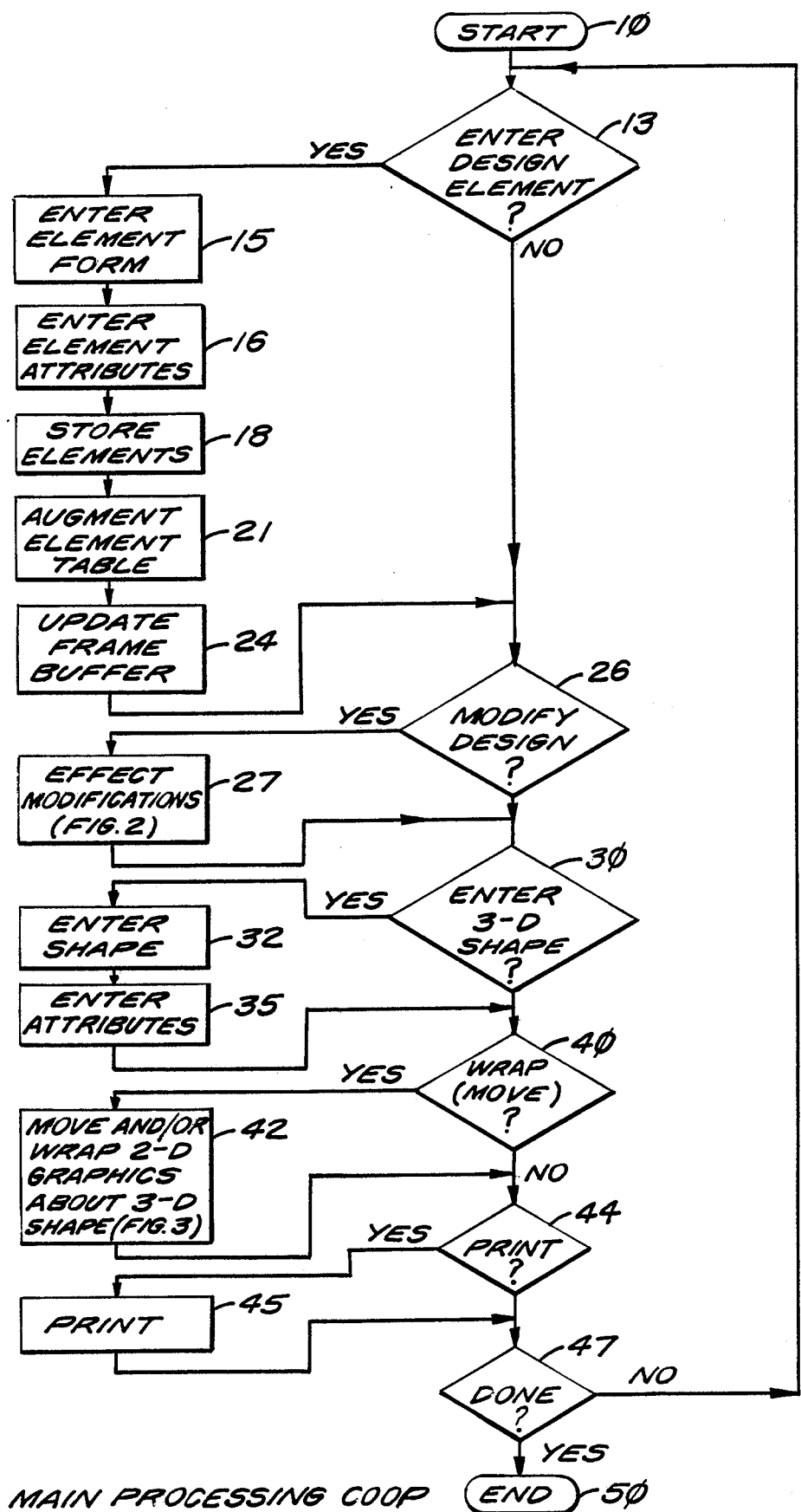

With the above overview in mind, attention will now be directed to FIG. 1 which discloses in overview the packaging graphics creating, modifying and printing system of the instant invention. Beginning at a start node 10, a test 13 inquires whether the designer wishes to enter a new element (constituent portion) for a graphics image being developed. If a negative response is entered (N$\phi$ processing branch), control passes to a test 26 to interactively query the system operator whether he wishes to modify an existing design stored in computer memory.

Assume for present purposes that a new element is to be entered (YES branch of test 13) to augment an existing design stored in memory or to initiate a new design. Block 15 interactively enters the form of the element. This may be effected in various ways under control of an input command entered by the system operator. Thus, for example, the new element may be text typed in via a controller keyboard or prestored text identified by an entered command word. Alternatively, the element form may be the content of a photograph or other literal image entered as via optical scanner, the formatted contents of magnetic media storage or otherwise as per se well known. A further mode of element entry, among others, comprises a command code which identifies one of a stored array of geometric shapes, e.g., circles, rectangles, ellipses, straight lines and so forth. The attendant obviously specifies via the keyboard the nature of the element being entered and, when appropriate, the computer port where entry will occur (e.g., keyboard, multiplexer input port, and so forth).

The next following step 16 comprises an interactive exchange with the system attendant to enter various attributes for the image being stored. The attributes define parameters of the subject element such as color (i.e., a specified color entered at the keyboard or a command signifying retention of the color already contained in a scanned image); the nature of the surface texture desired for the element (e.g., reflective, pebbled or other surface texture identifiers); position as in cartesian coordinates of the element; and priority (front-to-back sequence) of the element. Computer image development and display on a hierarchal, priority basis to present visible surfaces and suppress "hidden" surfaces is per se known and disclosed, for example in "A Real-Time Visible Surface Algorithm", G. S. Watkins, *University of Utah Computer Science Technical Rep.*, UTEC-CSC-70-101, June 1970, NTIS AD 762 004. Similarly, computer surface image simulation is per se known. Please see, for example, "A Reflectance Model For Computer Graphics", R. L. Cook and K. C. Torrance, Computer Graphics, Vol. 15, No. 3, August 1981. The disclosure of the Watkins and Cook and Torrance references, as well as the C. F. R. Weiman and J. F. Blinn papers, and the two McGraw-Hill texts below identified, are hereby incorporated herein by reference.

Data descriptive of the visual appearance of the image and its attributes is stored (step 18) in computer memory as in a data base associated with each element. Successor step 21 permits interactive augmentation of the element form or attribute data base storage, and the final entry step 24 updates the frame buffer (memory) which controls the image presented to the system user on the system display device which thus thereafter includes the newly added image elements. As is per se well known, the frame buffer may comprise a pixel-by-pixel (raster line element-by-element) picture information memory which gives rise to a raster scan developed image on the face of a cathode ray tube by conventional horizontal line sweeps and vertical deflection. Following frame buffer updating, the element entry subcycle is complete and system control passes to the next following provisional task 26.

Figure 2A:
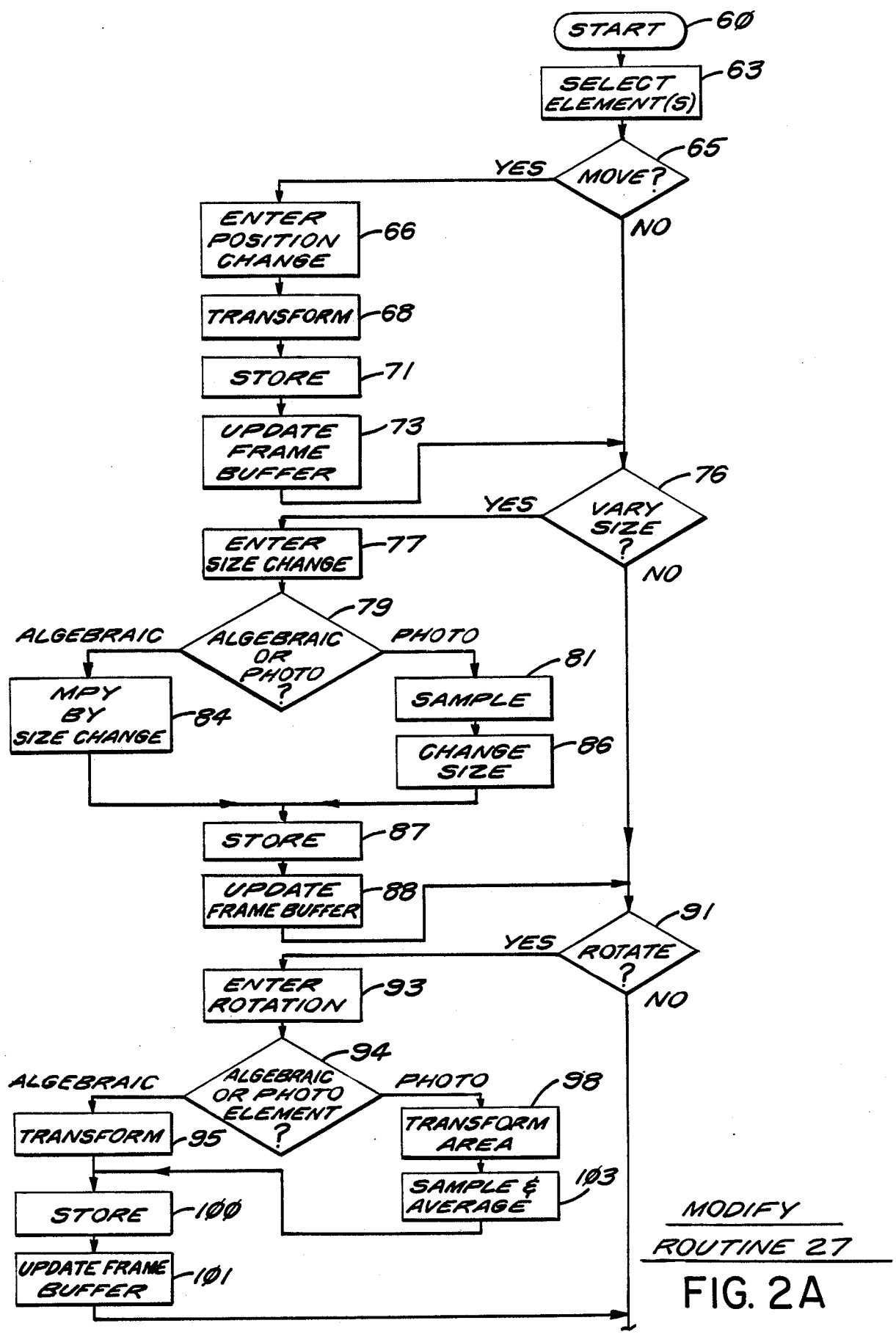
Figure 2B:
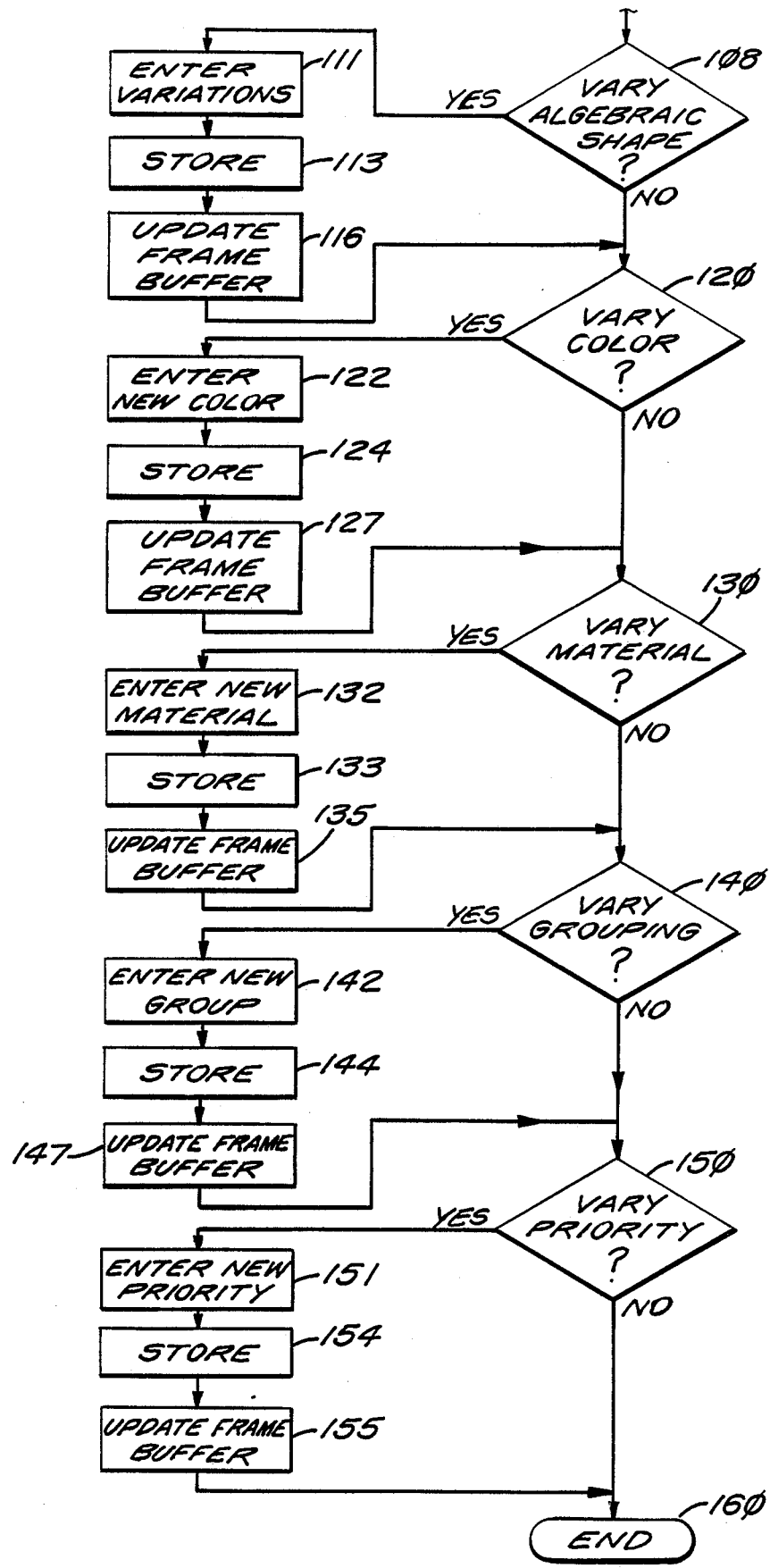

Following entry and definition of a picture element, or directly via the N$\phi$ branch of test 13, test 26 next permits the operator to vary any of the elements which form the packaging graphics at the system display. If modifications are desired (YES branch), control passes to a functional routine 27 which effects the desired changes. The modification routine 27 is expanded at length in FIGS. 2A and 2B and the discussion hereinbelow and will not be considered further at this point.

Proceeding beyond the modification test 26, operation 30 permits entry of a three dimensional form or shape about which the packaging is to be "wrapped". That is, a YES selection from test 30 permits entry of a particular shape which the design image displayed on the cathode ray tube and stored in the frame buffer is to attain. Assuming shape entry is desired (YES branch of test 30), the user specifies a theee dimensional form in any manner per se well known, e.g. and most simply, specifies one of a series of shapes initially stored within the computer memory (typically, cylinder, box, cube, sphere as well as any particular forms of particular interest to the attendant using a specfic system). A user may then enter further attributes of the shape (e.g., size, axis of rotation, display position or the like—operation 35) to complete shape entry or selection.

Figure 3:
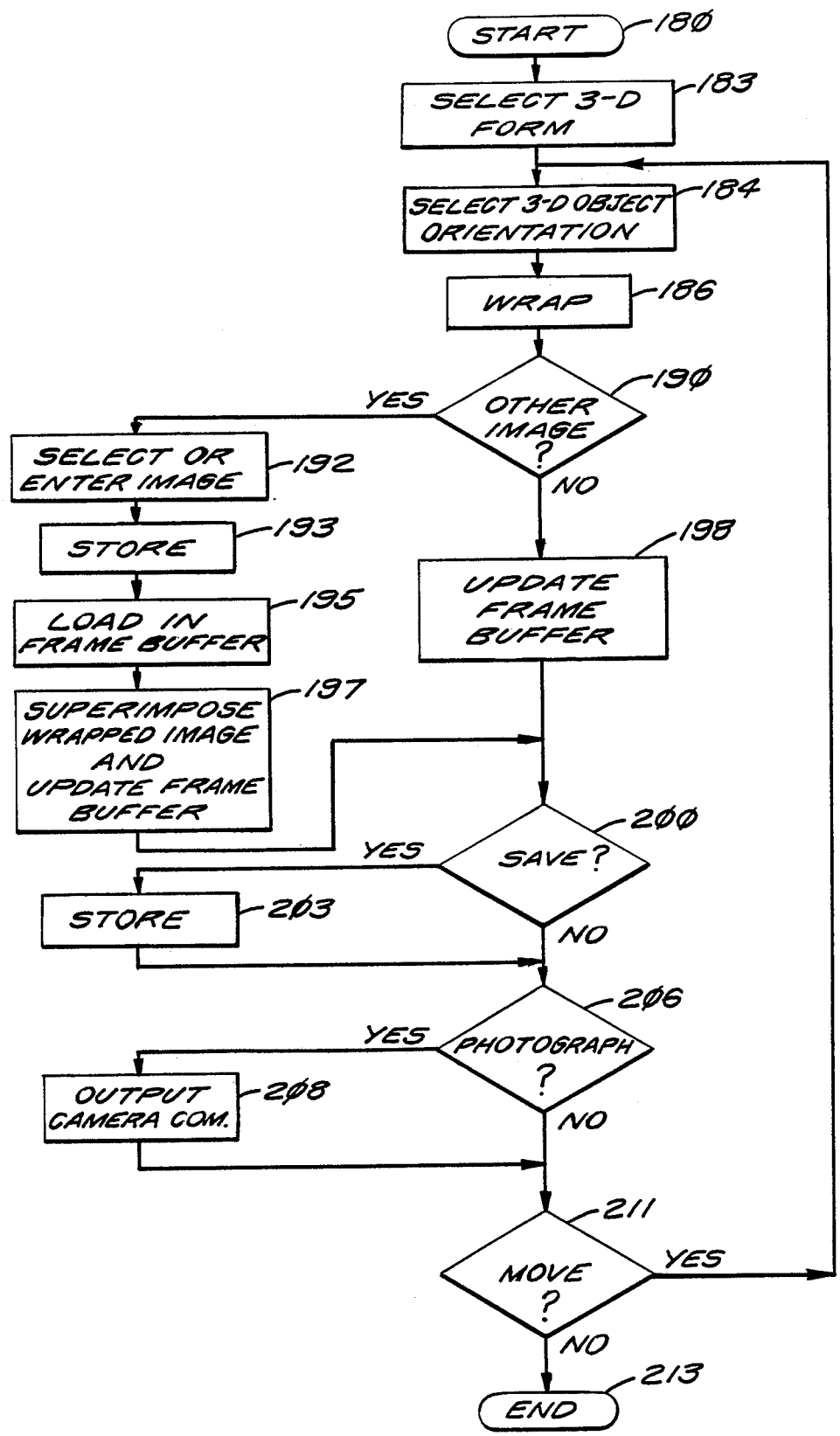
FIG. 3 is a flow chart depicting computer processing for a functional routine 42 (FIG. 1) which wraps packaging graphics stored in memory about a selected three dimensional form.

The following test 40 permits the user to "wrap" or form the planar packaging image about the surface of the entered or selected shape and move (rotate) the wrapped packaging (YES test output), the wrapping operation of step 42 being more fully expanded in the subroutine flow chart of FIG. 3. The packaging design as formed about a specific three dimensional shape presents the packaging at the cathode ray tube display as it will appear in its intended application. Moreover, this packaging can be rotated about an axis of rotation thus presenting the viewer at the display with the packaging from various inspection orientations for evaluation.

When the YES branch of the following test 44 is executed, a print or hard copy is made of the packaging graphics stored in the frame buffer. The printing step 45 may be implemented by any per se well known printing apparatus which reprodcues an image defined by the stored pixel type data raster in the frame buffer. The printed image may comprise a positive of the packaging graphics being designed. Alternatively, as per se known to those skilled in the art, the output of the printing equipment may be an inverse or negative image to create a master for reproducing the packaging via any printing or image reproduction apparatus.

The above-described FIG. 1 arrangement thus permits an attendant to fully develop and modify graphics which form part of a packaging enclosure. The element entry and modification sub-routines may be entered and executed as often as desired. A provisionally satisfactory (or intermediate) packaging design may be wrapped about a desired form and rotated for viewing; and further corrections, rewrappings and re-rotations effected for as many iterations as needed until a suitable final packaging design has been completed.

When a satisfactory packaging image is attained, it is printed to reproduce the packaging material as required for its intended commercial or other service.

The desired entry (13), modification (26), three dimensional form entry and wrapping (30 and 40), and printing (44) operations are shown in FIG. 1 as being effected in a hierarchal sequence which is stepped through to choose the procedure currently desired for image processing. Alternatively, as per se well known to those skilled in the art, a "menu" mode of data processing may be implemented where the functional options 13, 26, 30, 40 and 44 are listed. The system operator then chooses a particular operation which is immediately performed without the need for negative responses for operations not then desired.

Also, it will be apparent that the FIG. 1 and other processing algorithms of the instant invention may be implemented on substantially any main frame, microprocessor, or other digital computer and coded in any program language usable with the processor employed.

Referring now to composite FIG. 2, there is shown in expanded form the subroutine 27 (FIG. 1) for modifying any one of the image elements stored in the element data base in computer memory. Following a subroutine entry start node 60, the operator selects one (or more) of the image elements to be processed (step 63). A first test 65 interactively inquires whether the image modification desired is to specifically move the element, i.e., to translate the element to a different position in the overall image. Assuming a YES response for MOVE test 65, the position change command is entered (step 66) in any manner per se well known, i.e., via keyboard magnitude and directional entry, joy stick or "mouse" type transducer, or the like. As positional movement commands are entered by the attendant, the subject element changes its relative positioning in the specified direction in the image and that change of position is presented to the viewer via the display until the new image element position accords with the operator's wishes. The position change may be executed by simply adding the appropriate $\Delta x$ and $\Delta y$ cartesian coordinate increments to the position contents of the element data base (step 68). The new positional information for the element is stored in memory (step 71), and the frame buffer is updated (step 73) to now contain video information having the subject element in its new location. This completes the movement of the specified element(s) and control passes to the main processing path.

A next following test 76 inquires of the user whether a change in size of the selected element is desired. If so, the user enters the size change desired (step 77)—as by keyboard or transducer control. Test 79 examines the element table data base for the selected element to distinguish whether the element is a photographic (and therefore a literal) entry or whether it is an algebraic form defined by line and shape formula or the like. Where an algebraic element is encountered, its form is simply modified using the size change desired as a multiplier (step 84). That is, to make a square, line or any other algebraic (geometric) form larger or smaller, the distance between its bounding coordinates is simply multiplied by the size change factor entered at step 77.

Correspondingly, when test 79 signals from the element data base that a photographic element is being processed, its size is changed by one of the per se well known algorithms therefor. For example, the stored photographic definition of the image may be sampled (step 81) and the individual photographic constituent pixel samples expanded or contracted as appropriate (step 86) in accordance with the size change factor element entered at step 77. For object image translation and image sampling, averaging and size changing (and rotation), please see "Mathematical Elements for Computer Graphics", D. Rodgers and J. A. Adams, McGraw-Hill, 1976 (especially Chapter 3) and "Continuous Anti-Aliased Rotation of Zoom of Raster Images", C. F. R. Weiman, *Computer Graphics,* Vol. 14, no. 3, July 1980, the disclosures of which are hereby incorporated herein by reference.

For either algebraic (geometric) or photographic elements the enlarged or contracted image elements are stored in computer memory (step 87) and the size-changed element entered into the frame buffer. Thereafter the image displayed on the screen presents the element changed to the desired relative image size to the updated frame buffer.

Comparable processing occurs responsive to a YES output of test 91 signalling that an individual element or elements of an image are to be rotated relative to a fixed image reference plane. The desired rotation is entered at step 93, again either numerically or otherwise at a keyboard or via a transducer. Test 94 distinguishes between an algebraic (geometric) or photographic (literal) image element. Where an algebraic element is noted from the element data base, it is rotated by having its x and y coordinates rotated by the well known equations therefor.

Where a photographic element is noted, it is rotated on a scanned pixel-by-pixel basis, again in a manner per se well known to those skilled in the art. One mode of photographic rotation is to conceptually scan an image in a raster like manner and transform the image so electronically viewed on an area by area basis. Each pixel of a rotated scanning axis will in general intercept several stored pixels of the original, unrotated image. Contributions from the plural intercepted pixels are averaged to define the new pixel. The transformed image (steps 98 and 100) is stored in computer memory (step 100) and the changed image entered into the frame buffer (step 101) to vary the preserved and displayed modified design in accordance with the operator's desires. As above noted, image rotation is per se known. See the materials above identified.

The next series of possible element variations may be discussed as a group and operate comparably to perform their individual offices. A YES response to test 108 permits the system user to enter via the keyboard or otherwise a variation in algebraic shape. This may comprise such as a change of fundamental shape (e.g., circle to oval or other form; an increased number of legs in a polygon; among the almost infinite range of possibilities). Whatever the variation entered at step 111, the changed element has its criteria stored in the updated memory element data base and the changed image entered into the frame buffer (step 116) to cause the display to reflect the attendant's desires. Similarly, test 120 and steps 122, 124 and 127 permit the user to vary the color for any element (step 122) and store the changed information (steps 124 and 127); and operations 130, 132, 133 and 135 permit element data base variation for the surface texture of an element, thereby changing its presentation in the packaging image (smooth to pebbled or the like).

Test 140 permits modification of the data base associated with each image element to change its element group identification as an aid to creating and modifying a composite packaging graphic image. For example, it will sometimes be desired that individual image components be separately accessible to change their shape, relative size, orientation or the like. On other occasions, it will be desired that combinations of image constituents be grouped as a single image "element" to rotate together as a unit; to experience common changes in relative image size and so forth. A YES selection for test 140 permits a changed group assignment for any image element (step 142) which then becomes part of the composite image as stored in memory (step 144) and in the frame buffer (step 147).

Finally for the composite image modification routine of FIG. 2, test 150 and its ancillary operations 151, 154 and 155 act to modify or vary the image priority of a composite packaging image element. The priority assignment controls the portion of one image element which is blocked out by a spatially interfering portion of another element (of a higher image priority) when the two occupy the same space in a composite presentation. That is, the priority is a front-to-back assignment for the image elements which obscures from viewer sight and design presentation portions of the lower priority images which are spatially behind the higher priority element. To vary priority, step 151 enters a new priority assignment for an image element which is then stored (step 154). The frame buffer then has the image recomputed in accordance with the new priority assignments for all of the image elements. Visible surface display algorithms are per se known. See, for example, the above-identified G. S. Watkins reference.

A separate subroutine may be included in the FIG. 2 processing loop to purge or eliminate an image element. This may more simply be done, however, by entering a delete code word to the element data base storage by FIG. 1 processing operation 21.

As above noted with respect to the FIG. 1 flow chart, FIG. 2 presents the various user functional options move, vary size, rotate and so forth in a hierarchal order requiring the user to enter negative responses to reach a functional operation of interest. Alternatively, as well known to those skilled in the art, the FIG. 2 functional subroutines can be operated on a menu basis permitting the system operator to step directly to the entry point of each subroutine, i.e., to the processing point given by the "YES" response to the test corresponding to the desired image varying operation.

Turning now to FIG. 3, there is shown in expanded detail the functional subroutine 42 (FIG. 1) for forming ("wrapping") the packaging graphics about the surface of a three dimensional shape. Proceeding from a start point 180, the user first selects a three dimensional form about which the wrapping is to proceed (e.g., a cylinder for a can label, flattened box for a frozen food or other packaging container, or the like). The selected form may simply be invoked by a reference to a stored ensemble of common shape definitions (cylinder, box, cube, sphere or the like). Alternatively, step 183 selects a shape specifically entered by the user via FIG. 1 operations 32 and 35. The shape is oriented (step 184) either to a default state or to a specified orientation about an axis of rotation. The packaging is then visually wrapped or formed into the specified three dimensional shape (step 186) in the manner per se well known for converting planar material to shaped form. Please see, for example, a thesis "Computer Display of Curved Surfaces", J. F. Blinn, Department of Computer Science, University of Utah thesis library, December 1978 and "Principles of Interactive Computer Graphics", W. M. Newman and R. F. Sproull, McGraw-Hill, 1973, the disclosures of which are hereby incorporated herein by reference Test 190 next inquires whether the packaging image wrapped about the specified shape is to be augmented by a further image. That is, the user may wish to evaluate his provisional packaging design as supplemented by additional image graphics contained in memory (e.g., an additional photograph, logo, text, geometrical form or combination of these) Assuming that image supplementation is not desired (NO branch of test 190), the display controlling frame buffer is loaded with the wrapped image (step 198) which is then displayed. When a supplementary image is desired, it is selected or entered (step 192) as from memory or from a system input device as above-described and stored in computer memory (193) with the original image. The integrated original and supplementary graphics are then wrapped about the three dimensional form and the resulting video display presentation loaded into the updated frame buffer (step 197). Accordingly, in steps 197 or 198 as appropriate, the display controlling frame buffer is loaded with the desired image wrapped onto the surface of the desired form for the then instantaneous orientation of the three dimensional shape. This composite image, wrapped around the instantaneously prevailing orientation of the three dimensional shape, is presented for viewing.

Test 200 and the memory loading storage operation 203 stores the frame buffer image if desired for some reason. Thus, for example, if one desires at some later time or times to view the wrapped image on either a stationary or moving picture basis, the television raster controlling data is preserved in memory for recall. Similarly, depending upon whether or not it is desired to photograph the system display (as via any instant photography camera), a test 206 provides an output command (step 208) to a camera controlling solenoid actuator or electronic shutter to photograph the displayed replica of the wrapped packaging design The final test 211 inquires of the user whether the image is to be moved (e.g., rotated) to present a view of the wrapped packaging design from all directions. This is implemented by rotating the appearance on the system display of the packaging wrapped about the three dimensional shape about the shape's specified axis of rotation. Where such rotation is desired (YES branch of test 211), control returns to step 184 to specify the next orientation of the three dimensional form about which the packaging image is to be wrapped. For the commonly desired appearance of rotation, step 184 simply increments the angular orientation by a fixed amount each new image frame. Assuming that the three dimensional form undergoes only a relatively small rotational displacement between consecutive television raster fields, to the human eye it will appear as a continuous rotation.

Figure 4A:
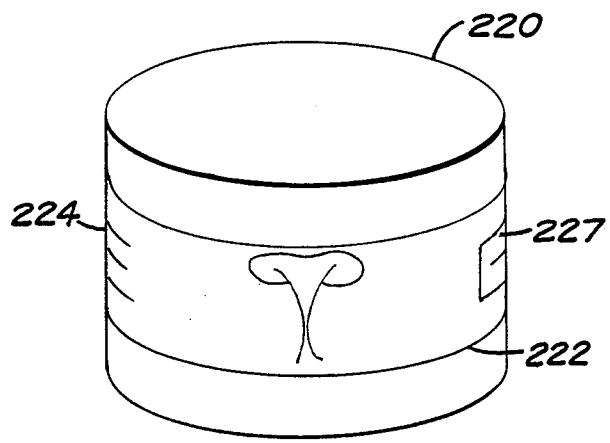
FIGS. 4A and 4B depict a wrapped packaging display viewed at two differing angular rotations for an assumed cylindrical three dimensional form (e.g., a can)
Figure 4B:
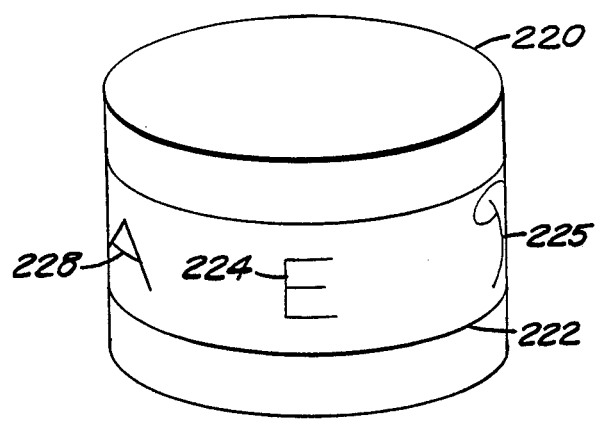

One illustrative form of display presentation, i.e., a packaging label 222 disposed about a flattened cylindrical can container 220 is shown in FIGS. 4A and 4B. Assume that the packaging graphics includes a horizontal array of four elements comprising from left to right (as viewed in flattened planar form) the letter "A" 228, the letter "E" 224, an arbitrary tree-like shape 225, and a further letter "G" 227. A first computer terminal display for the assumed packaging label is shown in FIG. 4A and includes the letter "E" 224 just beginning to appear in the visual field of view of the operator; the image tree-like constituent 225 centrally disposed for viewing; and the letter "G" 227 beginning to disappear from the right edge of the viewer's field of view for the assumed counterclockwise rotation of the "can" (cylinder) about its vertical axis. The letter "A" 228 is not available to the viewer since it is behind the 180° segment of the label viewing area available to the viewer.

At some substantial time later (relative to the can rotational speed), the can (cylinder) 220 is displayed in the orientation of FIG. 4B. The letter "A" 228 previously obstructed from view now enters the viewer's sight; the letter "E" 224 has progressed to full view; the image element 225 is beginning to disappear from the right edge of the cylinder; and the previously available letter "G" 227 is not displayed since it is conceptually behind the can and thus cannot be seen. In actual practice, the visual presentation appears continuous and proceeds in small incremental steps so all image element slowly enter the field of view from the left image edge and proceed across the cylinder face, disappearing from view as they pass by the right vertical side of the cylinder display. The image graphics shown in FIGS. 4A and 4B are obviously overly simple for purposes of presentation and explanation. For commercially viable packaging, the graphics would be far more complex, esthetically pleasing and meaningful.

Figure 5A:
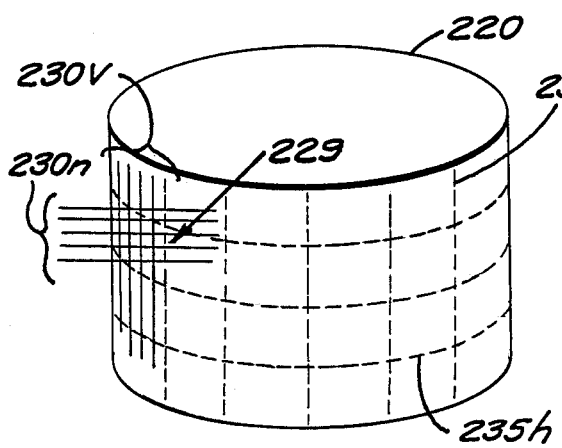
FIGS. 5A, 5B and 5C conceptually characterize the algorithm permitting a rotating wrapped video display of a developed packaging design in accordance with the principles of the present invention.
Figure 5B:
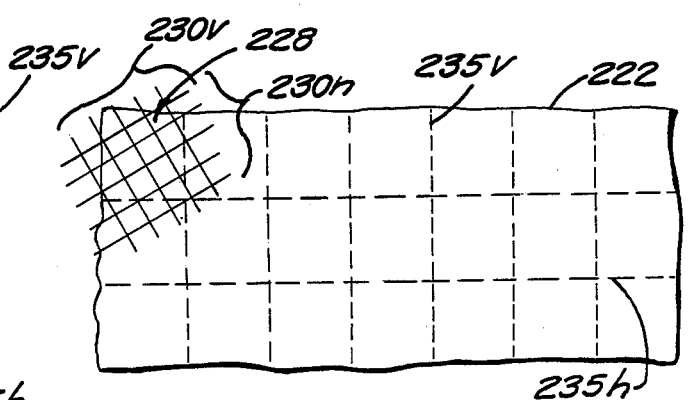
Figure 5C:
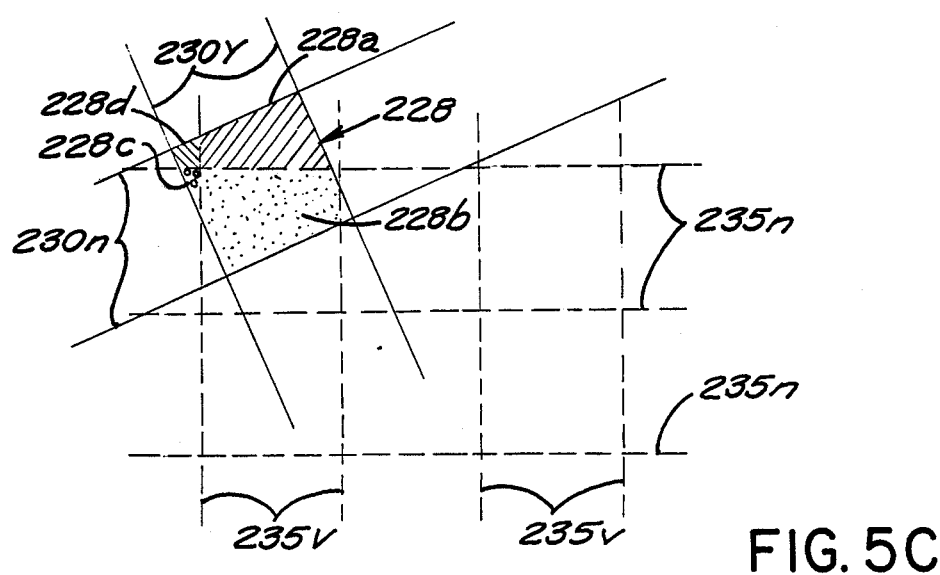

Again, the particular way that the display image is wrapped about the surface of a three dimensional form and rotated is per se well known and disclosed, for example, in the above-identified reference. It is schematically shown in FIGS. 5A–5C and discussed only very briefly here. The cylinder (or other) shape 220 is divided into a grid defined by horizontal and vertical conceptual lines $235_h$ and $235_v$, respectively. The cathode ray tube presentation obviously can proceed only by a raster sweep consisting of a number of horizontal cathode ray tube trace lines $230_n$. The nature of the algorithm, then, is to define on a pixel-by-pixel basis the video content of each horizontal line $230_n$ as it traverses conceptually across the grid $235_{v,h}$ of the display to be formed.

As is apparent from the FIG. 5A display object orientation, the horizontal lines $230_n$ will angularly proceed across the grid 235 in an acute angular relationship such as that shown in FIG. 5B. Each horizontal line pixel of the video line scan $230_n$ is defined by the content in the stored planar design in computer memory intercepted by the raster line trace. This process may be further understood with respect to the expanded view of FIG. 5C which shows one CRT line trace pixel, i.e., one component of the modulation for the cathode ray tube line $230_n$ in a section $230_y$. This line trace proceeds at an acute angle relative to the grid 235 in the stored planar image and is shown as intercepting partial areas $228_{a-d}$ from four portions of pixels in the stored image. The pixel $230_n$-$230_y$ in the wrapped image display comprises the weighted average of the contributions (as in color and intensity) of the four intercepted pixels. This operation proceeds across the line $230_n$; and also across the several hundred other lines 230 forming one composite video frame for the image (e.g., frames comparable to FIGS. 4A or 4B).

Accordingly, the above-described invention has been shown to permit development, modification and inspection of packaging graphics; and to present to the packaging creator a view of the packaging graphics formed about a specified three dimensional shape on either a stationary or rotating basis. The graphic elements can be entered, changed or modified as desired, with the system operator being afforded a continuous presentation of what he is creating as the effort proceeds. Once satisfied, the packaging graphics are supplied as an output via one or more photographs; as a stored image for transport to various printing or display media; or as a positive or negative image for reproduction apparatus.

The above-described arrangement is merely illustrative of the principles of the present invention. Numerous modifications and adaptations thereof will be readily apparent to those skilled in the art without departing from the spirit and scope of the present invention.

What is claimed is:

1. In combination in stored program controlled packaging developing apparatus for developing a plural element graphic packaging image, stored program controlled data processing means including memory means for storing plural attributes characterizing each image element, said data processing means including means for entering image elements, means for modifying image elements stored in said memory means, means for specifying a three dimensional form having an outer surface, and means for wrapping the graphic packaging image being developed about the outer surface of the three dimensional form specified by said form specifying means.

2. A combination as in claim 1, further comprising means for rotating said wapped graphic packaging image about an axis of rotation for the three dimensional fom specified by said form specifying means.

3. A combination as in claim 2, wherein said memory means further comprises display data base storing means for storing information representing the graphic packaging image being developed, and further comprising display means connected to said display data base storing means for displaying the image stored therein.

4. A combination as in claim 1, wherein said memory means further comprises display data base storing means for storing information representing the graphic packaging image being developed, and further comprising display means connected to said display data base storing means for displaying the image stored therein.

5. A combination as in claim 4, further comprising means for printing the graphic packaging image stored in display data base storing means.

6. A combination as in claim 1, wherein said image element modifying means comprises means for varying a relative size of said element, and means for storing the varied relative size in said memory means.

7. A combination as in claim 6, wherein said image element modifying means comprises means for varying an orientation of said element, and means for storing the varied orientation in said memory means.

8. A combination as in claim 7, wherein said image element modifying means comprises means for varying a surface texture of said element, and means for storing the varied surface texture in said memory means.

9. A combination as in claim 6, wherein said image element modifying means comprises means for varying a spatial priority of said element, and means for storing the varied spatial priority in said memory means.

10. A combination as in claim 6, wherein said image element modifying means comprises means for varying a position of said element, and means for storing the varied position in said memory means.

11. A combination in claim 10, wherein said image element modifying means comprises means for varying a spatial priority of said element, and means for storing the varied spatial priority in said memory means.

12. A combinatiuon in claim 10, wherein said image element modifying means comprises means for varying a grouping assignment of said element, and means for storing the varied element grouping assignment in said memory means.

13. In combination in stored program controlled packaging developing apparatus for developing a plural element graphic packaging image, stored program controlled data processing means including memory means for storing plural attributes characterizing each image element, said data processing means including means for entering image elements, means for modifying image elements stored in said memory means, means for specifying a three dimensional form having an outer surface, means for wrapping the graphic packaging image being developed about the outer surface of the three dimensional form specified by said form specifying means, and means for rotating said wrapped graphical image about an axis of rotation for the three dimensional form specified by said form specifying means, said memory means further comprising display data base storing means for storing information representing the graphic image being developed, and further comprising display means connected to said display data base storing means for displaying the image stored therein, and wherein said image element modifying means comprises means for varying a relative position of said element, and means for storing the varied position in said memory means and in the image stored in said display data base storing means.

14. A combination as in claim 13, wherein said image element modifying means comprises means for varying a relative size of said element, means for storing the varied relative size in said memory means and in the image information stored in said display data base storing means.

15. A combination as in claim 14, wherein said image element modifying means comprises means for varying an orientation of said element, means for storing the varied orientation in said memory means and in the image information stored in said display data base storing means.

16. A combination as in claim 15, wherein said image element modifying means comprises means for varying a surface texture of said element, means for storing the varied surface texture in said memory means and in the image information stored in said display data base storing means.

17. A combination as in claim 13, wherein said image element modifying means comprises means for varying a spatial priority of said element, means for storing the varied spatial priority in said memory means and in the image information stored in said display data base storing means.

* * * * *